US010132107B2

(12) United States Patent
Tomaszewski (10) Patent No.: US 10,132,107 B2
(45) Date of Patent: Nov. 20, 2018

(54) VEHICULAR LATCH WITH DIRECT LOCKING OF PAWL

(71) Applicant: Magna Closures Inc., Newmarket (CA)

(72) Inventor: Kris Tomaszewski, Newmarket (CA)

(73) Assignee: Magna Closures Inc., Newmarket (CA)

(*) Notice: Subject to any disclaimer, the term of this patent is extended or adjusted under 35 U.S.C. 154(b) by 859 days.

(21) Appl. No.: 14/410,634

(22) PCT Filed: Jun. 17, 2013

(86) PCT No.: PCT/CA2013/000577
§ 371 (c)(1),
(2) Date: Dec. 23, 2014

(87) PCT Pub. No.: WO2014/000084
PCT Pub. Date: Jan. 3, 2014

(65) Prior Publication Data
US 2015/0368934 A1    Dec. 24, 2015

Related U.S. Application Data

(60) Provisional application No. 61/663,881, filed on Jun. 25, 2012.

(51) Int. Cl.
| | |
|---|---|
| *E05B 79/10* | (2014.01) |
| *B60Q 9/00* | (2006.01) |
| *E05B 85/24* | (2014.01) |
| *E05B 81/06* | (2014.01) |
| *E05B 81/14* | (2014.01) |
| *E05B 81/34* | (2014.01) |
| *E05B 85/26* | (2014.01) |

(52) U.S. Cl.
CPC ............... *E05B 79/10* (2013.01); *B60Q 9/00* (2013.01); *E05B 81/06* (2013.01); *E05B 81/14* (2013.01); *E05B 81/34* (2013.01); *E05B 85/243* (2013.01); *E05B 85/26* (2013.01); *Y10T 292/1047* (2015.04); *Y10T 292/1079* (2015.04); *Y10T 292/1082* (2015.04); *Y10T 292/308* (2015.04)

(58) Field of Classification Search
CPC ......... Y10T 292/1047; Y10T 292/1082; Y10T 292/308
See application file for complete search history.

(56) References Cited

U.S. PATENT DOCUMENTS

| | | | | | |
|---|---|---|---|---|---|
| 3,386,761 | A | * | 6/1968 | Johnstone | ............... E05B 77/48 292/201 |
| 4,203,621 | A | * | 5/1980 | Noel | ....................... E05B 85/26 292/216 |

(Continued)

FOREIGN PATENT DOCUMENTS

| | | |
|---|---|---|
| WO | 2009143997 A1 | 12/2009 |
| WO | 2011094834 A1 | 8/2011 |

(Continued)

*Primary Examiner* — Carlos Lugo
(74) *Attorney, Agent, or Firm* — Dickinson Wright PLLC (57) ABSTRACT

A vehicle latch is provided having a ratchet, a primary pawl, an auxiliary ratchet and a secondary pawl, and further including a gear that is movable to a secondary pawl locking position wherein the gear directly blocks movement of the secondary pawl and locks the secondary pawl in an auxiliary ratchet holding position to prevent premature or unintended opening of the latch.

25 Claims, 10 Drawing Sheets

(56) References Cited

U.S. PATENT DOCUMENTS

| | | | | |
|---|---|---|---|---|
| 4,783,102 A * | 11/1988 | Bernard | ............... | E05B 85/26 292/216 |
| 4,948,184 A * | 8/1990 | Weyerstall | ............ | E05B 83/36 292/201 |
| 4,978,153 A * | 12/1990 | Hirsch | .................. | B04B 7/06 292/201 |
| 5,309,745 A * | 5/1994 | Ursel | ................... | E05B 81/06 292/201 |
| 5,802,894 A * | 9/1998 | Jahrsetz | ............... | E05B 77/48 292/144 |
| 6,056,334 A * | 5/2000 | Petzold | ............... | E05B 81/14 292/201 |
| 6,279,361 B1 * | 8/2001 | Baukholt | .............. | E05B 81/14 292/201 |
| 6,371,536 B1 | 4/2002 | Koerwer et al. | | |
| 6,386,599 B1 * | 5/2002 | Chevalier | ............. | E05B 81/14 292/201 |
| 6,428,058 B1 * | 8/2002 | Graute | ................ | E05B 85/01 292/201 |
| 6,474,704 B1 * | 11/2002 | Rathmann | ............ | E05B 81/14 292/201 |
| 6,523,376 B2 * | 2/2003 | Baukholt | .............. | E05B 81/14 292/201 |
| 6,598,911 B2 * | 7/2003 | Mejean | ............... | E05B 81/14 292/201 |
| 8,596,696 B2 * | 12/2013 | Cumbo | ................ | E05B 85/243 292/201 |
| 8,672,368 B2 * | 3/2014 | Grosdemouge | ....... | E05B 81/14 292/201 |
| 8,764,075 B2 * | 7/2014 | Taurasi | ................ | E05B 81/14 292/201 |
| 8,955,889 B2 * | 2/2015 | Bendel | ................. | E05B 81/20 292/200 |
| 9,512,651 B2 * | 12/2016 | Taurasi | ................ | E05B 77/36 |
| 2003/0038485 A1 | 2/2003 | Schwaiger et al. | | |
| 2004/0094971 A1 * | 5/2004 | Warmke | .............. | E05B 81/06 292/201 |
| 2005/0200137 A1 * | 9/2005 | Nelsen | ................ | E05B 81/06 292/201 |
| 2005/0212302 A1 * | 9/2005 | Fisher | ................. | E05B 81/14 292/216 |
| 2008/0250718 A1 | 10/2008 | Papanikolaou et al. | | |
| 2010/0052341 A1 * | 3/2010 | Taurasi | ................ | E05B 81/14 292/304 |
| 2012/0313384 A1 * | 12/2012 | Cumbo | ................ | E05B 81/14 292/199 |
| 2014/0091581 A1 * | 4/2014 | Taurasi | ................ | E05B 77/36 292/215 |

FOREIGN PATENT DOCUMENTS

WO 2012163503 A1 12/2012
WO 2014000084 A1 1/2014

* cited by examiner

VEHICULAR LATCH WITH DIRECT LOCKING OF PAWL

CROSS-REFERENCE TO RELATED APPLICATIONS

This application is a National Stage of International Application No. PCT/CA2013/000577 filed Jun. 17, 2013 which claims the benefit of U.S. Provisional Patent Application No. 61/663,881 filed Jun. 25, 2012, the entire content of each of the above applications is incorporated herein by reference.

FIELD

The disclosure generally relates to the art of vehicle latches and more specifically vehicle latches that utilize double pawl arrangements.

BACKGROUND

Double pawl arrangements are known in the latching art. The double pawl arrangement may utilize a primary pawl and ratchet connected to a secondary pawl and ratchet. The connection may be configured such that only a portion of the forces experienced by the primary pawl and ratchet are applied to the secondary pawl and ratchet, thus requiring a relatively low effort to release the latch. While a low effort to release the latch is desirable, a problem can occur that an unbalanced force may release the latch in unintended circumstances such as during a crash event. It would be desirable to prevent such events.

In addition, in double pawl arrangements both pawls must be reset to their locked positions. Biasing means such as springs are conventionally employed for such purpose. But over time, these biasing forces may degrade, or may be insufficient occasionally to cope with other impediments to returning the pawls to their respective locked positions. An at least partial solution is sought to such problems.

SUMMARY

In one aspect a vehicle latch is provided having a ratchet, a primary pawl, an auxiliary ratchet and a secondary pawl, and further including a gear that is movable to a secondary pawl locking position wherein the gear directly blocks movement of the secondary pawl and locks the secondary pawl in an auxiliary ratchet holding position to prevent premature or unintended opening of the latch.

In an embodiment of the above noted aspect, the ratchet is movable between a striker capture position wherein the ratchet is positioned to retain a striker and a striker release position wherein the ratchet is positioned to release the striker. The ratchet may be biased towards the striker release position. The primary pawl is movable between a ratchet holding position wherein the primary pawl is positioned to hold the ratchet in the striker capture position and a ratchet release position wherein the primary pawl permits the movement of the ratchet out of the striker capture position. The primary pawl may be biased towards the ratchet holding position. The auxiliary ratchet is operatively connected to the primary pawl and is movable between a primary pawl enabling position in which the auxiliary ratchet permits the primary pawl to move to the ratchet holding position and a primary pawl disabling position in which the auxiliary ratchet positions the primary pawl in the ratchet release position. The secondary pawl is movable between an auxiliary ratchet holding position in which the secondary pawl is positioned to hold the auxiliary ratchet in the primary pawl enabling position, and an auxiliary ratchet release position in which the secondary pawl is positioned to permit movement of the auxiliary ratchet to the disabling position. The secondary pawl may be biased towards the auxiliary ratchet holding position.

In another aspect, a vehicle latch is provided that includes a ratchet, a primary pawl, an auxiliary ratchet and a secondary pawl, and further including a gear that is operatively connected to the secondary pawl. The gear is rotatable to cause movement of the secondary pawl towards an auxiliary ratchet holding position and is rotatable to cause movement of the secondary pawl towards the auxiliary ratchet release position. The gear is rotatable to a secondary pawl locking position to lock the secondary pawl in the auxiliary ratchet holding position. The gear is rotatable to a reset position during which the gear causes movement of the secondary pawl to the auxiliary ratchet holding position after the auxiliary ratchet has moved to the primary pawl enabling position. In some embodiments the gear causes movement of the auxiliary ratchet to the primary pawl enabling position. A reset position sensor is provided and is positioned to detect the presence of the gear in the reset position.

In yet another aspect, a vehicle latch is provided, comprising a ratchet, a pawl and a gear. The ratchet is movable between a striker capture position wherein the ratchet is positioned to retain a striker and a striker release position wherein the ratchet is positioned to release the striker. The ratchet is biased towards the striker release position. The pawl is movable between a first position and a second position. When the ratchet is in the closed position and the pawl is in the first position, the pawl at least indirectly holds the ratchet in the closed position. When the pawl is in the second position, the pawl permits movement of the ratchet to the open position. The gear is movable to a pawl locking position wherein a gear locking surface on the gear directly blocks movement of a pawl locking surface on the pawl so that the gear directly locks the pawl in the second position. Optionally, the pawl is a secondary pawl and there is a primary pawl and an auxiliary ratchet provided.

In yet another aspect, a vehicle latch is provided and includes a motor, a worm, a gear, a primary ratchet, a primary pawl, an auxiliary ratchet and a secondary pawl all extend in planes that are parallel to each other.

In another embodiment of the above noted aspect, the ratchet is pivotally mounted to the housing via a primary ratchet pin joint and is movable between a striker capture position wherein the ratchet is positioned to retain a striker and a striker release position wherein the ratchet is positioned to release the striker. The ratchet may be biased towards the striker release position. The primary pawl is pivotally mounted to the auxiliary ratchet via a primary pawl pin joint and is movable between a ratchet holding position wherein the primary pawl is positioned to hold the ratchet in the striker capture position and a ratchet release position wherein the primary pawl permits the movement of the ratchet out of the striker capture position. The primary pawl may be biased towards the ratchet holding position. The auxiliary ratchet is pivotally mounted to the housing via an auxiliary ratchet pin joint and is operatively connected to the primary pawl and is movable between a primary pawl enabling position in which the auxiliary ratchet permits the primary pawl to move to the ratchet holding position and a primary pawl disabling position in which the auxiliary ratchet positions the primary pawl in the ratchet release position. The secondary pawl is pivotally mounted to the housing via a secondary pawl pin joint and is movable between an auxiliary ratchet holding position in which the secondary pawl is positioned to hold the auxiliary ratchet in the primary pawl enabling position, and an auxiliary ratchet release position in which the secondary pawl is positioned to permit movement of the auxiliary ratchet to the disabling position. The secondary pawl may be biased towards the auxiliary ratchet holding position. The gear is pivotally mounted to the housing via a gear pin joint.

In a further embodiment, the gear has a first gear drive surface that is engageable directly with a secondary pawl drive surface on the secondary pawl. Rotation of the gear to a secondary pawl release position directly drives the secondary pawl to the auxiliary ratchet release position. The gear also has a second gear drive surface that is engageable directly with an auxiliary ratchet drive surface on the auxiliary ratchet. Rotation of the gear to a reset position drives the auxiliary ratchet to the primary pawl enabling position and causes the secondary pawl to move to the auxiliary ratchet holding position.

In a still further embodiment, the latch further comprises a reset position sensor positioned to detect the presence of the gear in the reset position, a secondary pawl locking position sensor positioned to detect the presence of the gear in the secondary pawl locking position, a motor that is operatively connected to the gear, and a controller that is operatively connected to the motor. The controller receives signals from the reset position sensor that are indicative of whether the gear reaches the reset position, and signals from the secondary pawl locking position sensor that are indicative of whether the gear reaches the secondary pawl locking position. The controller is configured to:

a) selectively operate the motor to drive the gear towards the reset position; and b) notify a driver of the vehicle of a problem in the event that the gear does not reach the reset position after a selected period of time passes after step a) is initiated, and is configured to:

c) selectively cut power to the motor to cause movement of the gear towards the secondary pawl locking position; and d) carry out at least one action in the event that the gear does not reach the secondary pawl locking position after a selected period of time passes after step a) is initiated, wherein the at least one action is selected from the group of actions consisting of: notifying a driver of the vehicle of a problem with the vehicle latch; and drive the gear via the motor towards the secondary pawl locking position.

BRIEF DESCRIPTION OF THE DRAWINGS

The foregoing and other aspects will be more readily appreciated having reference to the drawings, wherein.

DETAILED DESCRIPTION

Figure 1:
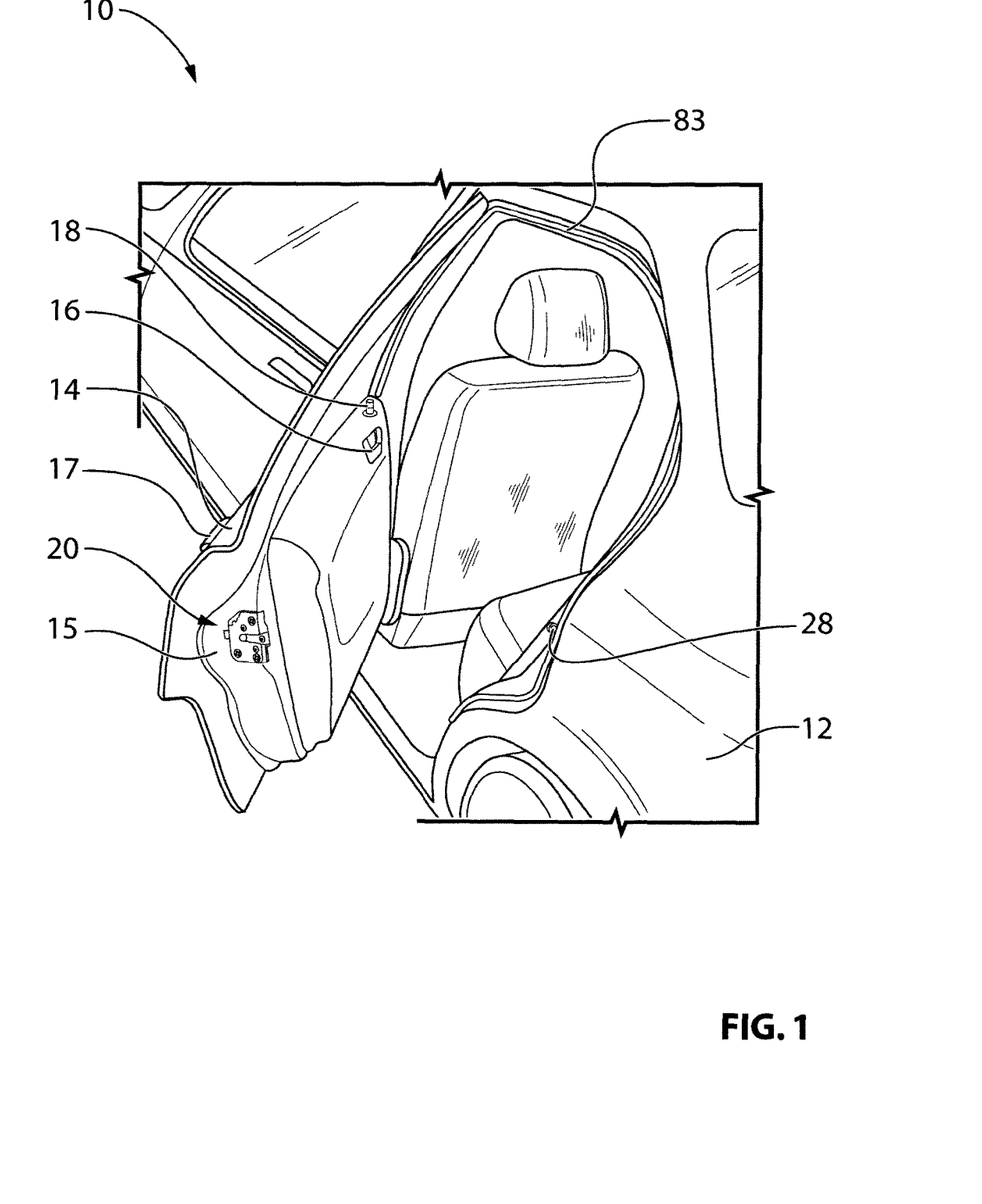
FIG. 1 is a perspective view of a vehicle having a door, which has a vehicle latch.

FIG. 1 is a perspective view of a vehicle 10 that includes a vehicle body 12 and at least one vehicle door 14. The vehicle door 14 includes a latch 20 that is positioned on an edge face 15 and which is releasably engageable with a striker 28 on the vehicle body 12 to releasably hold the vehicle door 14 in a closed position. An outside door handle 17 and an inside door handle 16 are provided for opening the latch 20 (i.e. for releasing the latch 20 from the striker 28) to open the vehicle door 14. An optional lock knob 18 is shown and provides a visual indication of the lock state of the latch 20 and may be operable to change the lock state between an unlocked position and a locked position.

Figure 2A:
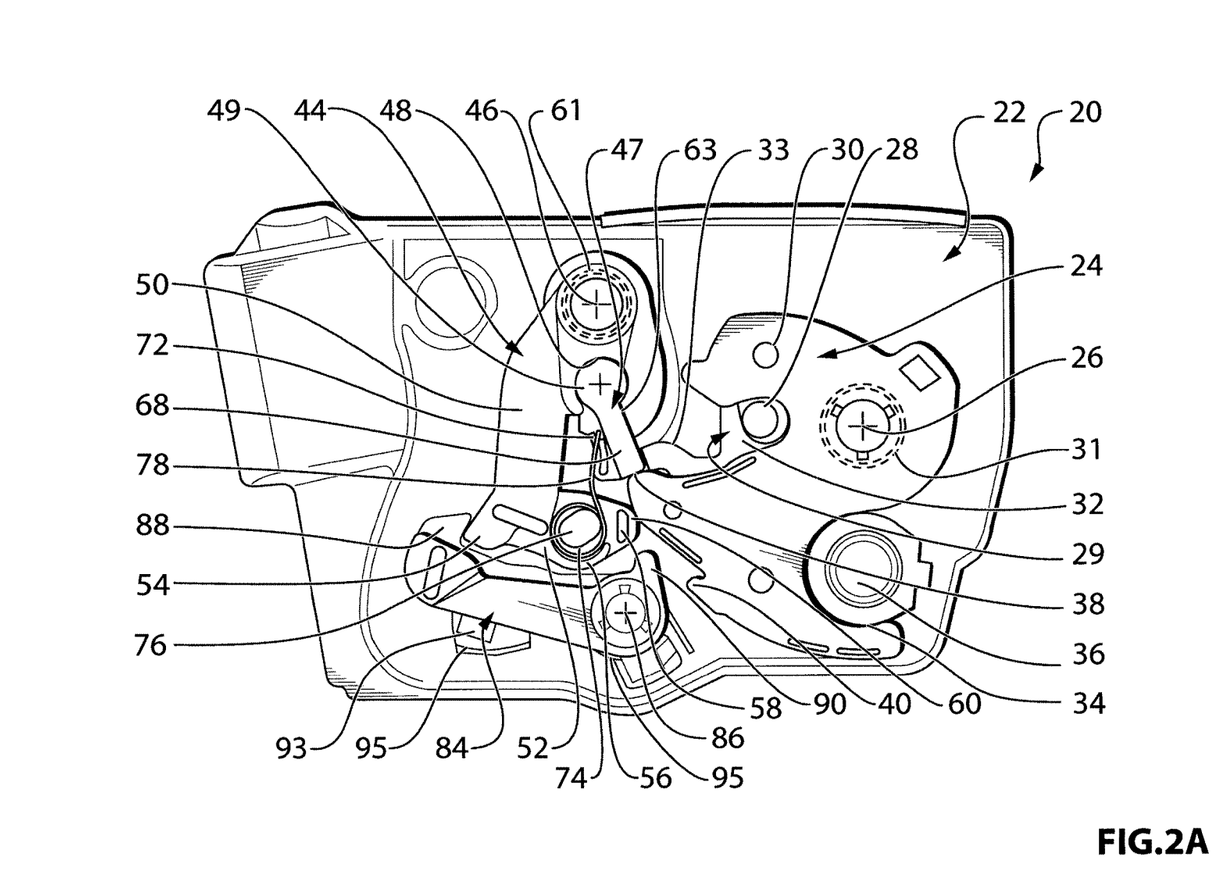
FIG. 2A is a plan view of the latch shown in FIG. 1 with a portion of the housing of the latch omitted and in a secondary pawl locking position.
Figure 2B:
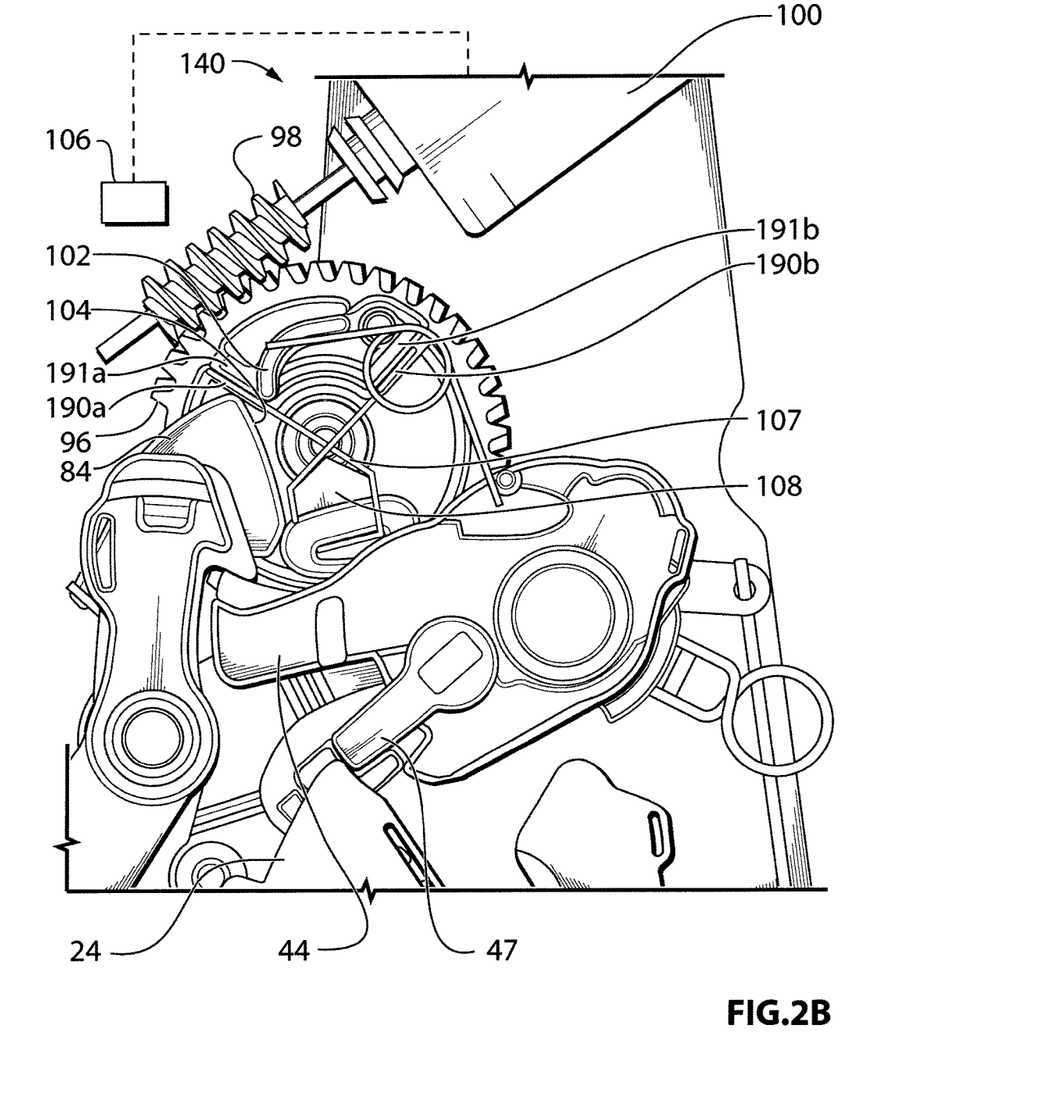
FIG. 2B is a plan view of a portion of the latch shown in FIG. 2A in the secondary pawl locking position.

FIGS. 2A and 2B are front views of the latch 20. The latch 20 includes a housing 22 to which a primary ratchet 24 (which may, for convenience, be referred to as the ratchet 24) is pivotally mounted via a primary ratchet pin joint 21 for rotation about a primary ratchet pivot axis 26 mounted in the housing 22. The ratchet 24 pivots between a fully closed position wherein the striker 28 (shown schematically in stippled lines) is captured in a slot 29 by a hook 30 of the ratchet 24, as shown in FIG. 2A, and an open position (FIGS. 5A and 5B) wherein the striker 28 is not trapped by the hook 30 and is free to move out of the slot presented by the ratchet 24. In the view shown in FIG. 2A the ratchet 24 rotates clockwise to move from the closed position to the open position.

The ratchet 24 is biased towards the open position via a ratchet biasing member 31. The biasing member 31 may be any suitable type of biasing member, such as, for example, a torsion spring. A striker bumper 32 is mounted in the housing 22 (underneath the ratchet 24) to cushion against the striker force of impact and a ratchet bumper 34 is also mounted about a post 36 provided in the housing 22 to cushion against the ratchet force of impact.

Figure 5A:
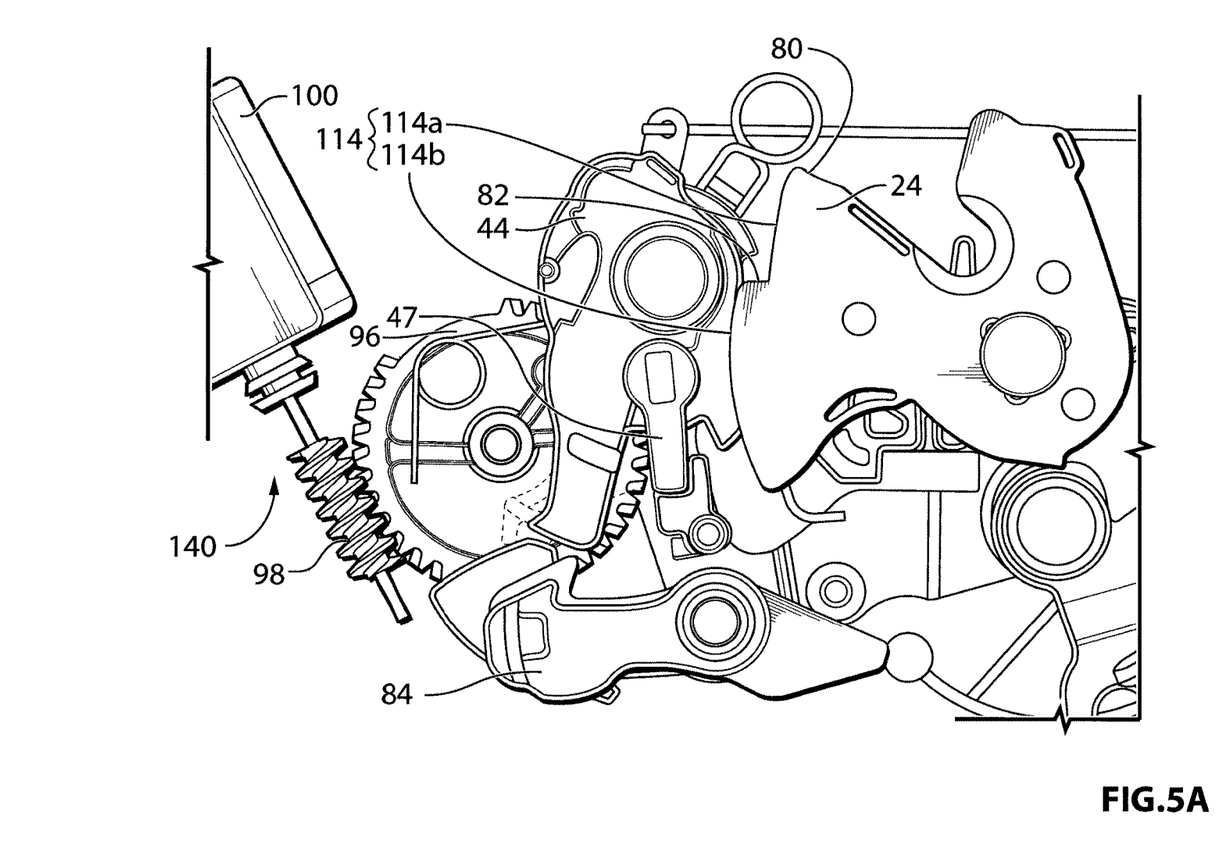
FIG. 5A is a plan view of the latch shown in FIG. 2A in a secondary pawl release position.
Figure 5B:
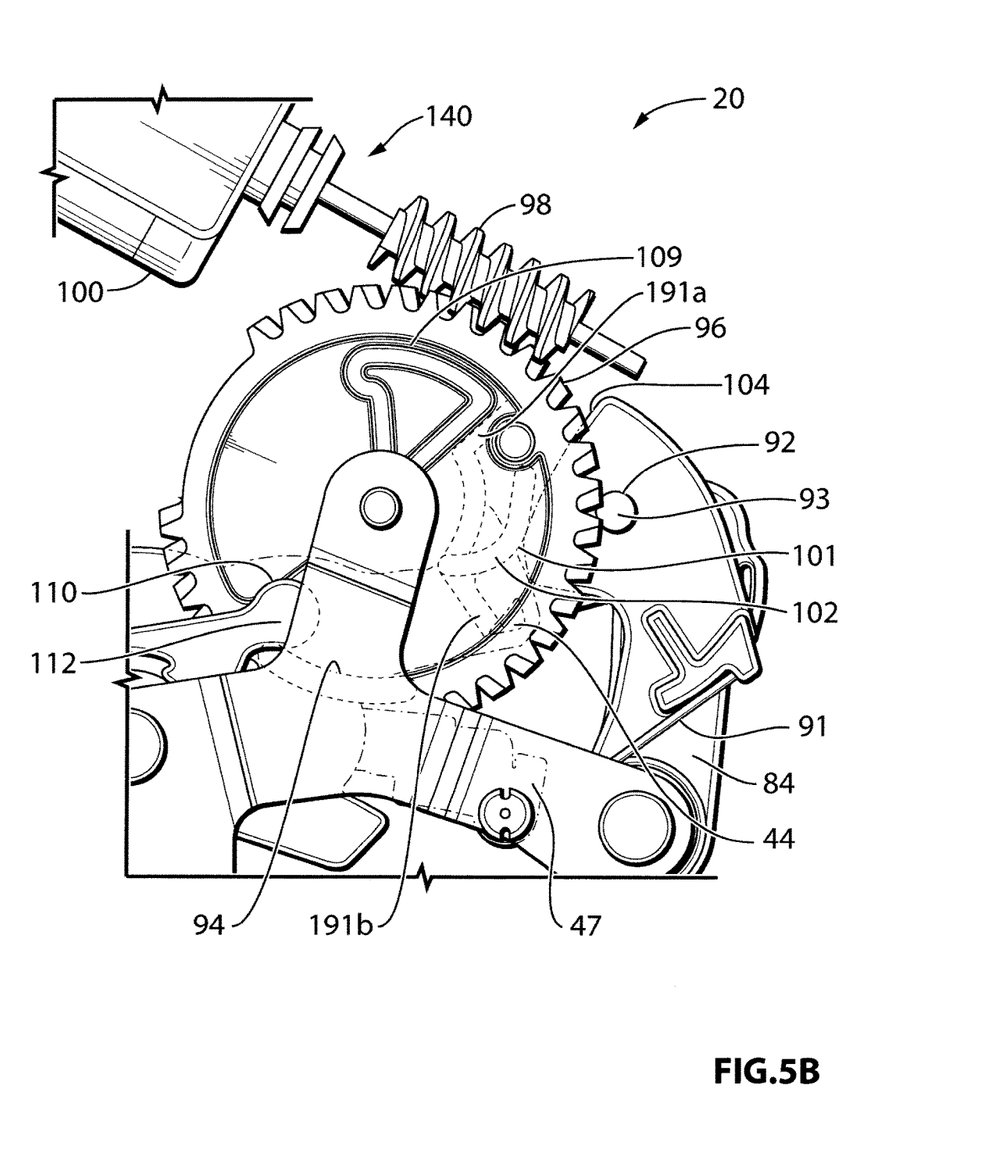
FIG. 5B is a plan view of a portion of the latch shown in FIG. 5A in the secondary pawl release position.

An auxiliary ratchet 44 is also pivotally mounted in the housing 22 via an auxiliary ratchet pin joint 45 for movement about an auxiliary ratchet pivot axis 46. A primary pawl 47 is pivotally mounted to the auxiliary ratchet 44 via a primary pawl pin joint 49 for movement about a primary pawl pivot axis 51. The auxiliary ratchet 44 is movable between a primary pawl enabling position (FIG. 2A) and a primary pawl disabling position (FIG. 5A). In the primary pawl enabling position the auxiliary ratchet 44 permits the primary pawl 47 to move to a ratchet locking position to hold the ratchet 24 in the closed position, as shown in FIG. 2A. In the primary pawl disabling position (FIG. 5A) the auxiliary ratchet 44 prevents movement of the primary pawl 47 to the ratchet locking position, and instead holds the primary pawl 47 in a ratchet release position, as discussed in greater detail below. In the view shown in FIG. 2A the auxiliary ratchet 44 rotates clockwise to reach the primary pawl disabling position.

The auxiliary ratchet 44 includes a cylindrical bore 48 which receives a cylindrical stub of the primary pawl 47 for pivotally mounting the primary pawl 47 into the bore 48, thereby forming pin joint 49 of the auxiliary ratchet 44. This provides a simple means for mounting the primary pawl 47, which may be formed from a simple stamped or sintered metal piece.

The auxiliary ratchet 44 also includes a leg 50 which optionally, as shown in FIG. 2A, terminates in an anvil 52 having a check shoulder 54 and a cam lip 56. The auxiliary ratchet 44 may be encapsulated with an elastomeric material and features an optional hollow 58 (FIG. 2A) so as to provide an elastically deformable band 60 for contacting and absorbing impact against the ratchet 24. A variant shown in FIG. 2B does not include the cam lip 56, the band 60 and the hollow 58.

An auxiliary ratchet biasing member 61 located on the opposing side of the housing 22 biases the auxiliary ratchet 44 to the primary pawl disabling position. Only the hub portion of the auxiliary ratchet biasing member 61 is shown in FIG. 2A, (and is shown in stippled lines), for simplicity. The biasing member 61 may include a first tang (not shown) that abuts a capstan of pin 46 and a second tang which cooperates with a fork (not shown) in the auxiliary ratchet 44 via a slot (not shown) formed in the housing 22.

Referring back to FIG. 2A, the primary pawl 47 includes a check arm 68. In the ratchet locking position the check arm 68 stops the ratchet 24 from opening, as shown in FIG. 2A. In the view of FIG. 2A the primary pawl 47 rotates clockwise to move to the ratchet release position.

The angular sweep of the check arm 68 is limited on one side by an edge 63 in the auxiliary ratchet 44 and on the other side by the auxiliary ratchet leg 50. A proboscis bumper 72 formed from an encapsulation of the primary pawl 47 may be provided to cushion impact of check arm 68 against the auxiliary ratchet leg 50. An extension 33 of the striker bumper 32 may be provided to reduce or cushion impact of check arm 68 against the auxiliary ratchet edge 63.

The primary pawl 47 is biased towards the ratchet locking position by a primary pawl biasing member 74 wrapped around a post 76 provided in the anvil 52 of the auxiliary ratchet 44. One tang (not visible in FIG. 2A) of the biasing member 74 rides against the auxiliary ratchet leg 50, and another tang 78 abuts the check arm 68 of the primary pawl 47. As the biasing member 74 is mounted to the auxiliary ratchet 44 rather than the fixed housing 22, the biasing forces on the primary pawl 47 will not vary appreciably as the auxiliary ratchet 44 rotates. In embodiments wherein the post 76 is not provided, the biasing member 74 may be provided on the housing 22 or at some other location on the auxiliary ratchet 44.

The ratchet 24 features primary and secondary locking surfaces 80 and 82 that interact with the check arm 68 of the primary pawl 47. The primary locking surface 80 provides a fully closed position for the ratchet 24 in which the striker 28 is securely ensconced in the slot 31 of the ratchet 24 such that the vehicle door 14 is completely closed and the door seals 83 are compressed. The secondary locking surface 82 provides a partially closed and locked position of the ratchet 24 wherein the striker 28 is loosely secured in the slot 31 of the ratchet 24 such that the vehicle door 14 is locked but not completely closed against the door seals 83.

A secondary pawl 84 is pivotally mounted in the housing 22 via a secondary pawl pin joint 85 for movement about a secondary pawl pivot axis 86 for movement between an auxiliary ratchet holding position where the secondary pawl 84 holds the auxiliary ratchet 44 in the primary pawl enabling position, as shown in FIG. 2A, and an auxiliary ratchet release position in which the secondary pawl 84 permits the auxiliary ratchet 44 to move to the primary pawl disabling position. In the view shown in FIG. 2A the secondary pawl 84 rotates counterclockwise to reach the auxiliary ratchet release position. The secondary pawl 84 includes a hook shoulder 88 for engaging the auxiliary ratchet check shoulder 54.

The secondary pawl 84 is biased towards the auxiliary ratchet holding position by a secondary pawl biasing member 91. The secondary pawl biasing member 91 may be any suitable type of biasing member, such as, for example, a torsion spring.

Figure 3:
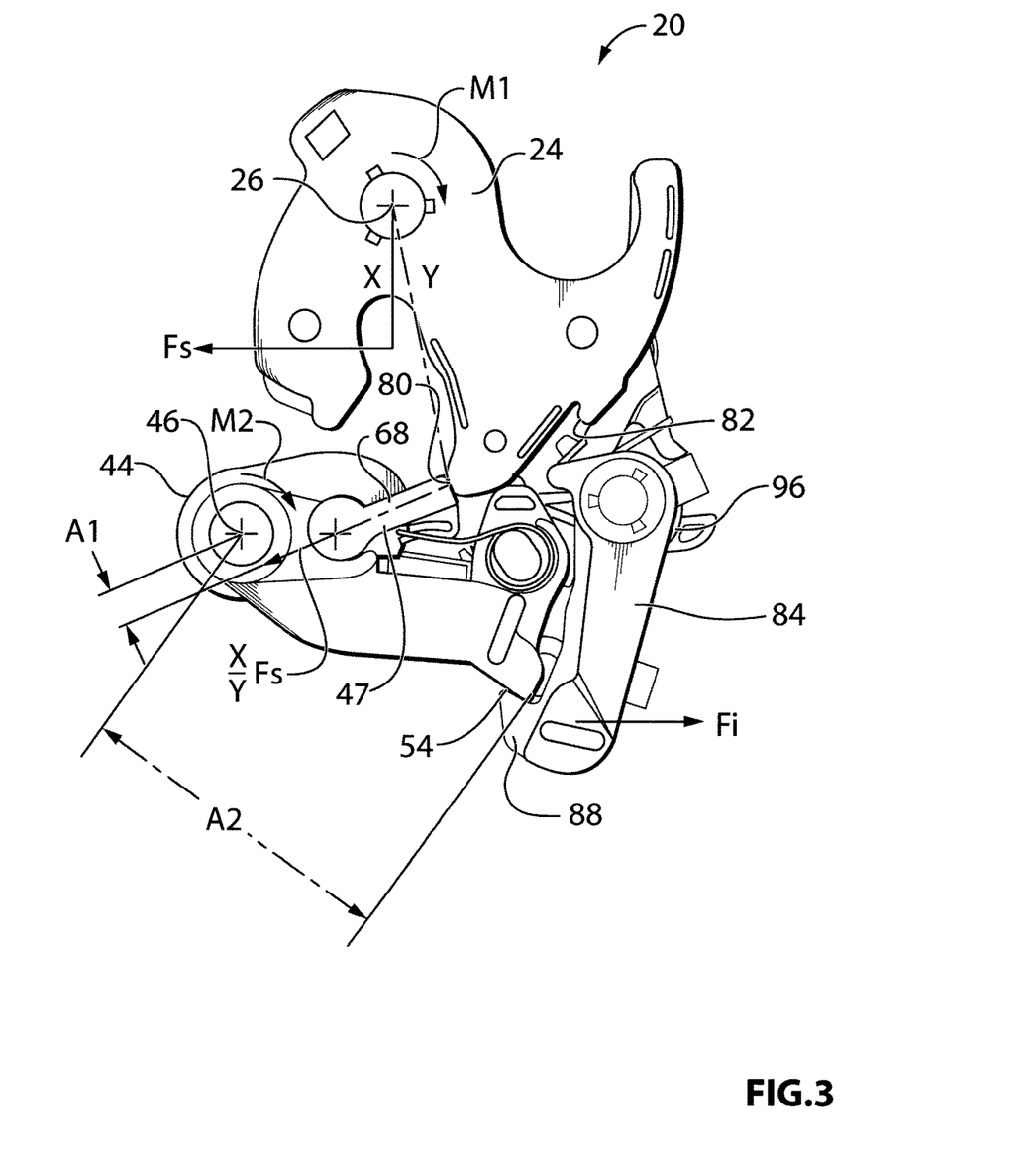
FIG. 3 is a view of the latch shown in FIG. 2A illustrating forces acting on components of the latch.

It will thus be seen from the foregoing that the latch 20 provides an eccentric double pawl arrangement for lowering release effort. More particularly, as illustrated in FIG. 3, there exists a force Fs on the ratchet 24 that is a reaction to the seal force from the door seals 83 when the vehicle door is closed. The force Fs along with the ratchet bias force presents a moment M1 on the ratchet 24. The force necessary to move the primary pawl 47 will thus be related to the coefficient of friction between check arm 68 and ratchet shoulder 38 multiplied by a force approximately X/Y of Fs, where X is the radial distance between the striker and the ratchet pivot axis 26 and Y is the distance between the primary pawl/ratchet contact area and the ratchet pivot point. In practice, the ratio X/Y could be about 40%. Similarly, the force X/Y*Fs applied to the primary pawl 68 presents a moment M2 about the auxiliary ratchet 44. The force necessary to move the secondary pawl 84 will thus be related to the coefficient of friction between secondary pawl hook shoulder 88 and auxiliary ratchet check shoulder 54 multiplied by a force approximately A1/A2 of X/Y*Fs, where A1 is the radial distance between the force on the primary pawl 47 and the auxiliary ratchet pivot axis 46 and A2 is the radial distance between the secondary pawl/auxiliary ratchet contact area and the auxiliary ratchet pivot point. In practice, the ratio A1/A2 can be as low as 10-20%. Thus, a relatively low release effort may be required to open the latch 20.

Figure 2C:
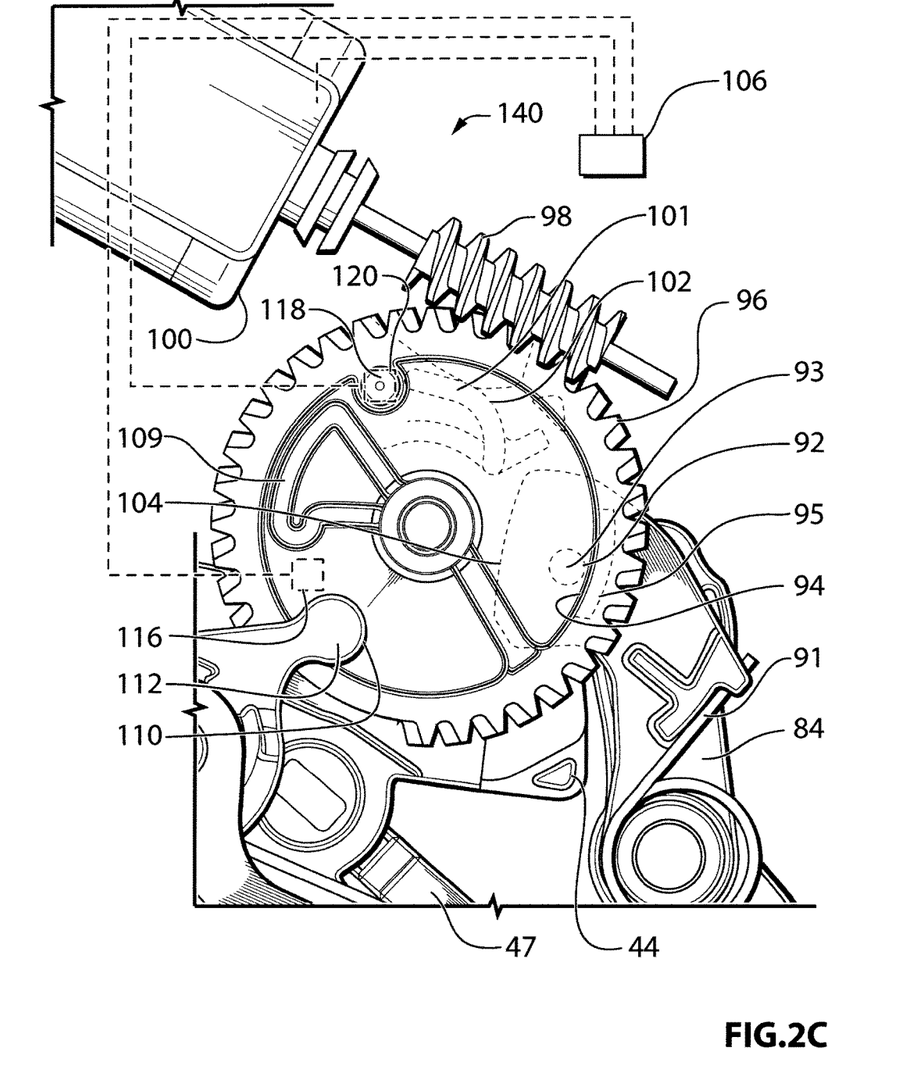
FIG. 2C is a plan view of a portion of the latch shown in FIG. 2A in the secondary pawl locking position.

Referring to FIG. 2C, which is a view from the opposite side of the latch 20 to that which is shown in FIGS. 2A and 2B, the secondary pawl 84 includes a first locking surface 92 on a secondary pawl locking projection 93. A second locking surface 94 is on a gear locking projection 95, which is provided on a gear 96. As shown in FIG. 2C, the gear 96 is rotatably mounted to the housing 22 via a pin joint 97 for movement about a gear axis 99. The gear 96 is driven by a worm 98, which is itself driven by a motor 100. The gear 96 is movable (i.e. rotatable) between a secondary pawl locking position shown in FIG. 2C in which the second locking surface 94 directly blocks (or otherwise cooperates with) the first locking surface 92 to prevent movement of the secondary pawl 84 out of the auxiliary ratchet holding position, and a secondary pawl release position shown in FIG. 5B, in which the second locking surface 94 is out of the way of the first locking surface 92 and thus permits the secondary pawl 84 to move to the auxiliary ratchet release position.

Figure 4:
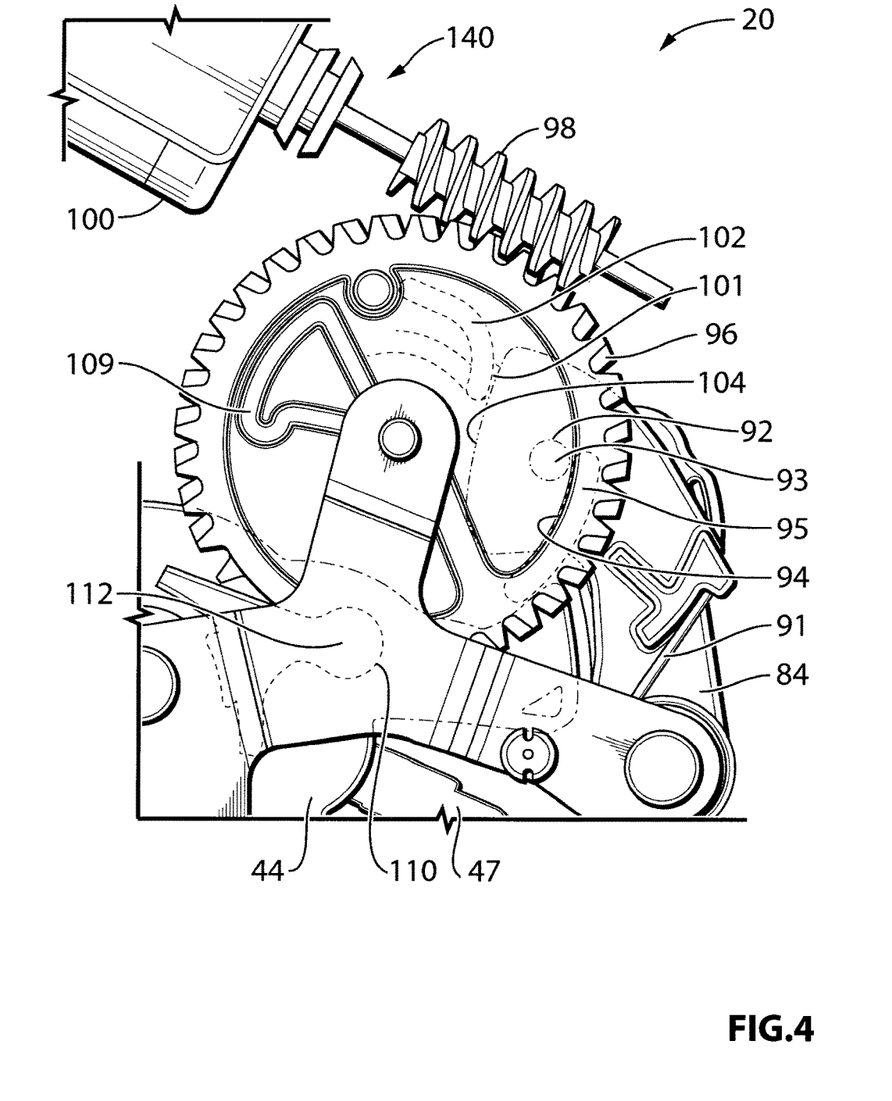
FIG. 4 is a plan view of a portion of the latch shown in FIG. 2A leaving the secondary pawl locking position.

Movement of the gear 96 from the secondary pawl locking position (FIG. 2C) to the secondary pawl release position (FIG. 5B) may optionally cause the secondary pawl 84 to move to the auxiliary ratchet release position. Specifically, the gear 96 may include a first gear drive surface 101 on a projection 102 that is engageable with a secondary pawl drive surface 104 on the secondary pawl 84. When the gear 96 is in the secondary pawl locking position (FIG. 2C), the first gear drive surface 101 may be spaced from the secondary pawl drive surface 104. As the gear 96 moves from the secondary pawl locking position the gear 96 first reaches a secondary pawl unlocking position shown in FIG. 4, in which the first locking surface 92 moves out of the way of the second locking surface 94. After the gear 96 reaches the secondary pawl unlocking position, further rotation of the gear 96 causes the first gear drive surface 101 to drive the secondary pawl 84 out of the auxiliary ratchet holding position, until the gear 96 reaches the secondary pawl release position (FIG. 5B), at which point the first gear drive surface 101 has driven the secondary pawl 84 to the auxiliary ratchet release position (against the biasing force of the secondary pawl biasing member 91). This permits the auxiliary ratchet 44 to move to the primary pawl disabling position under the biasing force of the auxiliary ratchet biasing member 61, which in turn brings the primary pawl 47 to the ratchet release position, which in turn permits the ratchet 24 to move to the open position. The seal force Fs from the door seals 83 and the biasing force from the ratchet biasing member 31 both drive the ratchet 24 to the open position, thereby releasing the striker 28 and opening the vehicle door 14.

The motor 100, which is operatively connected to the gear 96 through the worm 98, may be an electric motor. An electronic controller shown schematically at 106 may be provided and may be operatively connected to the motor 100, and may selectively send power to the motor 100 to selectively drive the motor 100. The controller 106 may be dedicated to the latch or may be part of some other controller for the vehicle, such as a central ECU that is used to control several other functions in the vehicle including, for example, crash detection.

The controller 106 may have any suitable structure, and may, for example, include a processor, memory and may contain code that permits the controller 106 to control the operation of the motor 100 and to carry out the other functions described herein.

To sense when the gear 96 has reached the secondary pawl release position, a limit switch (such as a "door open" switch, handle switch or both), by sensing a current spike as a result of a component hitting a hard limit, or by reaching a specified time for applying power to the motor gear assembly 140. An embodiment employs a limit switch in conjunction with a timeout to avoid unnecessary power consumption. When the controller 106 detects that the gear 96 has reached the secondary pawl release position, the controller 106 immediately rotates the gear wheel 96 to a reset position (shown in FIGS. 6A and 6B) to bring the latch 20 to a reset position to ready the latch 20 to receive and capture the striker 28 again. To move the gear 96 to the reset position, the motor 100 drives the gear 96, optionally in the opposite direction to the direction used to bring the gear 96 to the secondary pawl release position. Rotation of the gear 96 to the reset position causes movement of the auxiliary ratchet 44 from the primary pawl disabling position to the primary pawl enabling position via engagement of a second gear drive surface 109 with an auxiliary drive surface 110 on an arm of a reset lever 112 that rotates about the same axis as the auxiliary ratchet 44 (i.e. axis 45). The reset lever 112 is engageable with the auxiliary ratchet 44 by way of a reset lever spring (not shown) that acts between the auxiliary ratchet 44 and the reset lever 112, thereby providing some amount of lost motion available between the auxiliary ratchet 44. Thus, when the gear 96 drives the reset lever 112 (via engagement between surface 109 and surface 110), the reset lever 112, in turn, drives the auxiliary ratchet 44 through the reset lever spring. It will be noted that in FIGS. 2A-6B the housing 22 has been omitted so as to reveal components that would otherwise be obscured.

After driving the auxiliary ratchet 44 to the primary pawl enabling position, further rotation of the gear 96 to the reset position brings the gear drive surface 104 away from the secondary pawl 84 thereby permitting the secondary pawl 84 to return to the auxiliary ratchet holding position so as to capture the auxiliary ratchet 44 in the primary pawl enabling position. Once the gear 96 has reached the reset position, the controller 106 may stop sending current to the motor 100. As a result, a centering spring shown at 107 in FIG. 2b that may be provided on a post 108, drives the gear 96 to return to the secondary pawl locking position. In the example shown in FIG. 2b, the centering spring 107 has a first tang 190a that engages a first tang receiving wall 191a on the gear 96 and a second tang 190b that engages a second tang receiving wall 191b on the gear 96. For greater clarity a centering spring is a spring that permits movement of an object in either of two opposing directions away from a rest position, wherein regardless of which direction the object is moved in, the centering spring urges the object back towards the rest position.

Figure 6A:
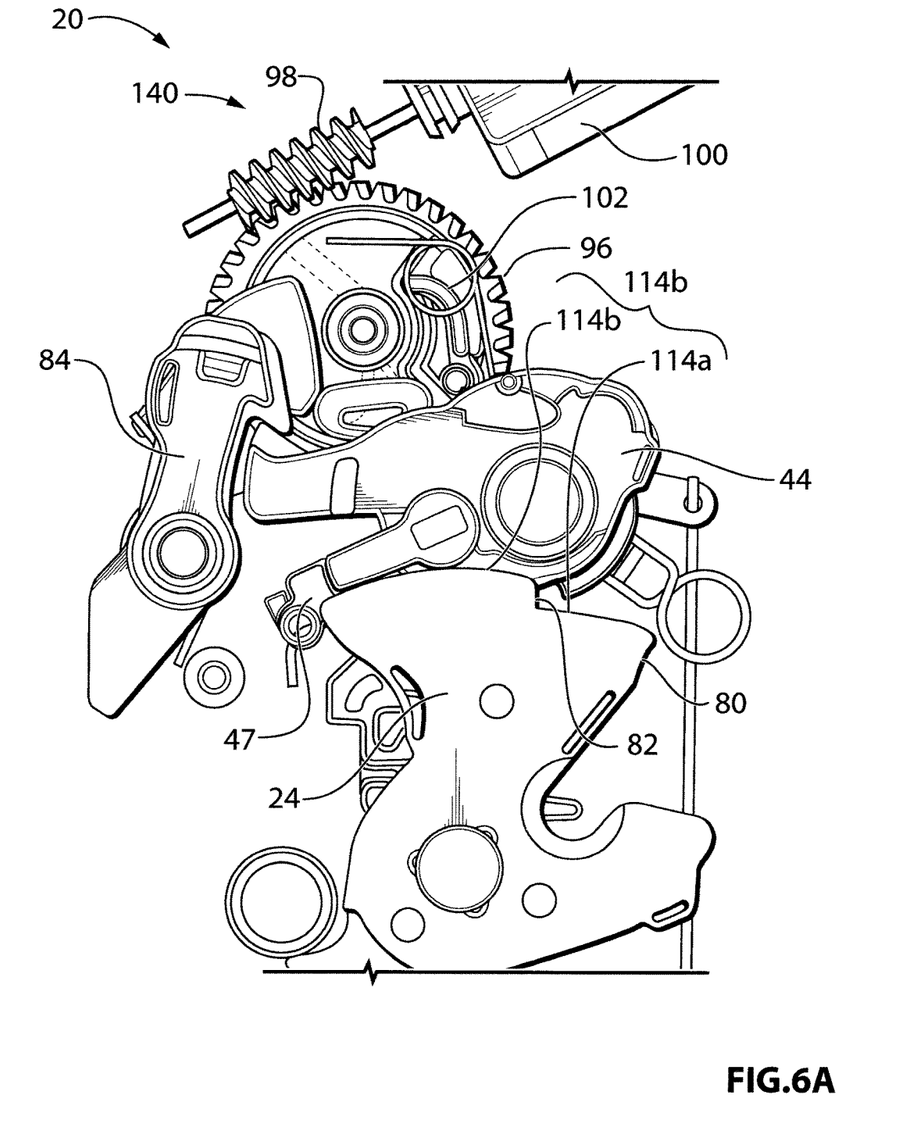
FIG. 6A is a plan view of the latch shown in FIG. 2A in a reset position.

As can be seen in FIG. 6A, however, even though the auxiliary ratchet 44 is in the primary pawl enabling position, the primary pawl 47 is not in the ratchet locking position; instead the primary pawl 47 abuts a side edge 114 of the ratchet 24, and not the primary or secondary locking surfaces 80 and 82 respectively of the ratchet 24, because the ratchet 24 is itself in the open position. The side edge 114 is divided into a first side edge portion 114a that extends between the primary and secondary locking surfaces 80 and 82, and a second side edge portion 114b that continues from the secondary locking surface 80 onwards. When the latch 20 is in the reset position as described above, the latch 20 is ready to receive and capture the striker 28 when the vehicle door 14 is closed.

Initially, in the reset position, the primary pawl 47 abuts the second side edge portion 114b. When the vehicle door 14 is closed and the striker 28 engages the slot 31 of the ratchet 24, the striker 28 drives the ratchet 24 to rotate (counter-clockwise in the view shown in FIG. 6A) towards the fully closed position. As the secondary locking surface 82 sweeps past the primary pawl 47, the primary pawl biasing member 74 falls into contact with the first side edge portion 114a (from the biasing force of the biasing member 74). As the ratchet 24 moves into the fully closed position and the primary locking surface 80 sweeps past the primary pawl 47 the primary pawl 47 moves into the ratchet locking position to prevent the ratchet 24 from leaving the closed position. The latch 20 is then in the closed position shown in FIGS. 2A-2C.

In operation, in the auxiliary ratchet holding position, the secondary pawl 84 can be subject to an inertia force Fi (see FIG. 3) that may occur, for example, in the event of a vehicle crash. The force Fi, which does not need to be particularly high given the low release efforts required to open the latch 20 as discussed above, will urge the secondary pawl 84 towards the auxiliary ratchet release position. However, the locking of the secondary pawl 84 by the locking surface 92 on the gear 96 advantageously prevents the secondary pawl 84 from pivoting into the auxiliary ratchet release position during a crash.

By locking the secondary pawl 84 in the auxiliary ratchet holding position directly with the gear 96, the use of a separate lever and spring is avoided. This simplifies the construction, reduces the cost and increases the reliability of the latch 20 relative to a version of the latch 20 that would include an additional locking lever and spring.

Figure 6B:
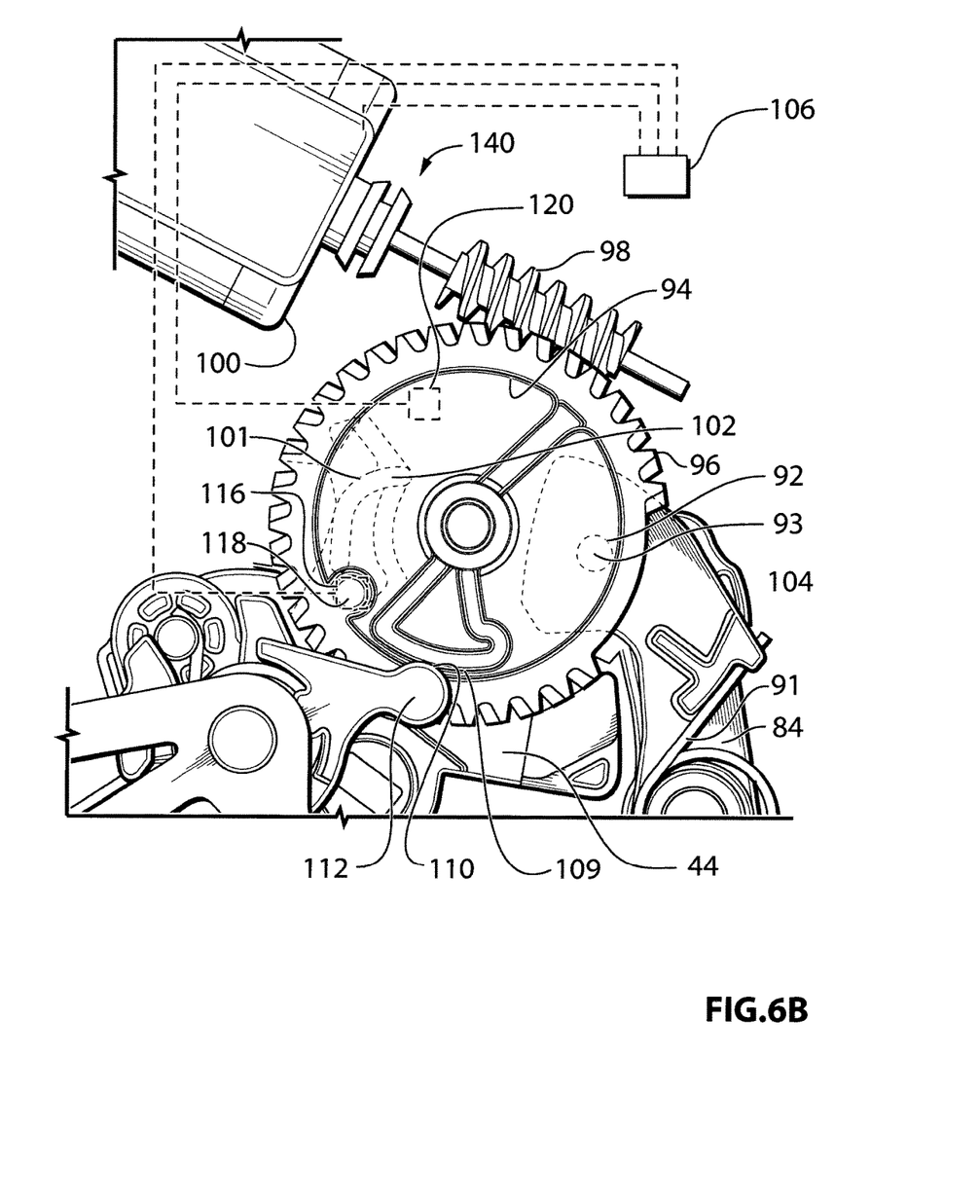
FIG. 6B is a plan view of a portion of the latch shown in FIG. 6A in the reset position.

Referring to FIG. 6B, structure may be provided to verify that the gear 96 has reached the reset position. For example, a first Hall-effect sensor shown at 116 may be provided and may be positioned (e.g. on the housing 22) for sensing the presence of a magnet 118 positioned on the gear 96 when the gear 96 reaches the reset position. The sensor 116 may be referred to as a reset position sensor and may send signals to the controller 106 that are indicative of whether the gear 96 is in the reset position. Thus, when the controller 106 attempts to drive the gear 96 to the reset position the reset position sensor 116 can send a signal to the controller 106 to indicate when the gear 96 has reached the reset position. If, within a selected period of time after sending power to the motor 100 to drive the gear 96 to the reset position, the controller 106 does not receive a signal indicating that the gear 96 has reached the reset position the controller 106 may notify the vehicle driver of a problem with the vehicle latch 20. Notifying the vehicle driver of a problem with the vehicle latch 20 may, for example entail sending signals to an ECU in the vehicle.

In addition to sensing when the gear 96 reaches the reset position, the latch 20 may be configured to sense when the gear 96 reaches the secondary pawl locking position. For example, the latch 20 may include a second Hall-effect sensor 120 that may be referred to as a secondary pawl locking position sensor and that is positioned (e.g. on the housing 22) for sensing the presence of the magnet 118 when the gear 96 reaches the secondary pawl locking position. After cutting power to the motor 100 after the gear 96 reaches the reset position, if the controller 106 does not receive a signal from the second Hall-effect sensor 120 indicating that the gear 96 has reached the secondary pawl locking position under the biasing force of the centering spring 107 within a selected period of time (e.g. a second selected period of time), the controller 106 may send power to the motor 100 to drive the gear 96 to the secondary pawl locking position. Upon receiving a signal from the second Hall-effect sensor 120 indicating that the gear 96 has reached the secondary pawl locking position, the controller 106 may cut power to the motor 100. If, after a further period of time, the controller 106 still does not receive a signal indicating that the gear 96 has reached the secondary pawl locking position, the controller 106 may notify the vehicle driver or may send a signal to an ECU in the vehicle indicating that there is a problem with the latch 20.

Thus, the controller 106 carries out at least one action in the event that the gear 96 does not reach the secondary pawl locking position after a selected period of time passes after the cutting of power to the motor 100 is initiated. The at least one action is selected from the group of actions consisting of: notifying a driver of the vehicle 10 of a problem with the latch; and sending power to the motor 100 to drive the gear 96 towards the secondary pawl locking position.

While the sensors 116 and 120 are shown to be Hall-effect sensors, they may alternatively be any other suitable kind of sensor. For example, the sensors 116 and 120 could be limit switches and the magnet 118 could be replaced by a simple protrusion on the gear 96 that closes the contacts on one of the limit switches when the gear 96 reaches the reset or secondary pawl locking positions. Alternatively, the sensor 116 may be a sensor to detect a current spike in the current supplied to the motor 100 as the gear 96 dead-ends at the reset position. In such an embodiment, structure would be provided to limit one end of the travel of the gear 96 at the reset position, thereby generating the current spike in the motor 100.

While the embodiments shown in the figures include a ratchet, a primary pawl, an auxiliary ratchet, and a secondary pawl, it is alternatively possible to provide a different arrangement. In an aspect, the latch may include a ratchet, similar to the ratchet 24, a pawl similar to pawl 84 and a gear similar to gear 96. The ratchet is movable between a striker capture position wherein the ratchet is positioned to retain a striker and a striker release position wherein the ratchet is positioned to release the striker. The ratchet may be biased towards the striker release position (e.g. by a biasing member similar to biasing member 31). The pawl is movable between a first position and a second position. When the ratchet is in the closed position and the pawl is in the first position, the pawl at least indirectly holds the ratchet in the closed position, and wherein when the pawl is in the second position, the pawl permits movement of the ratchet to the open position. The pawl may be biased towards the first position (e.g. by a biasing member similar to biasing member 91). The gear is movable to a pawl locking position wherein a gear locking surface on the gear directly blocks movement of a pawl locking surface on the pawl so that the gear directly locks the pawl in the second position.

In some embodiments, the pawl is directly engaged with the ratchet. In other embodiments the pawl may be a secondary pawl, and the vehicle latch may further include a primary pawl and an auxiliary ratchet, similar to the arrangement shown in the figures.

A feature of some embodiments that can be seen in FIGS. 5a and 6a in particular, is that the motor 100, the worm 98, the gear 96, the primary ratchet 24, the primary pawl 47, the auxiliary ratchet 44 and the secondary pawl 84 all extend in planes that are parallel to each other. As a result, the overall shape of the latch 20 may be thinner than some latches of the prior art. This may be advantageous in permitting the latch 20 to fit in a vehicle door 14 where space is restricted.

While the above describes one or more particular embodiments, it will be appreciated that modifications and variations may be made to the embodiments described herein without departing from the proper scope of the claims appended hereto.

The invention claimed is:

1. A vehicle latch, comprising:
   a ratchet movable between a striker capture position wherein the ratchet is positioned to retain a striker and a striker release position wherein the ratchet is positioned to release the striker, wherein the ratchet is biased towards the striker release position;
   a primary pawl movable between a ratchet holding position wherein the primary pawl is positioned to hold the ratchet in the striker capture position and a ratchet release position wherein the primary pawl permits the movement of the ratchet out of the striker capture position, wherein the primary pawl is biased towards the ratchet holding position, the primary pawl being pivotally mounted to an auxiliary ratchet;
   wherein the auxiliary ratchet is movable between a primary pawl enabling position in which the auxiliary ratchet moves the primary pawl and then permits the primary pawl to be biased toward the ratchet holding position and a primary pawl disabling position in which the auxiliary ratchet positions the primary pawl in the ratchet release position, wherein the auxiliary ratchet is biased towards the primary pawl disabling position;
   a secondary pawl movable between an auxiliary ratchet holding position in which the secondary pawl is positioned to hold the auxiliary ratchet in the primary pawl enabling position, and an auxiliary ratchet release position in which the secondary pawl is positioned to permit movement of the auxiliary ratchet to the primary pawl disabling position, wherein the secondary pawl is biased towards the auxiliary ratchet holding position; and a gear that is operatively connected to a motor for movement in response to selective actuation of the motor to a secondary pawl locking position in which a gear locking surface on the gear directly blocks movement of a secondary pawl locking surface on the secondary pawl so that the gear directly locks the secondary pawl in the auxiliary ratchet holding position.

2. A vehicle latch as claimed in claim 1, wherein the gear is operatively connected to the secondary pawl such that rotation of the gear to a reset position causes movement of the secondary pawl to the auxiliary ratchet holding position after the auxiliary pawl is in the primary pawl enabling position.

3. A vehicle latch as claimed in claim 2, wherein the gear has a first gear drive surface that is engageable directly with a secondary pawl drive surface on the secondary pawl and wherein rotation of the gear to a secondary pawl release position directly drives the secondary pawl to the auxiliary ratchet release position.

4. A vehicle latch as claimed in claim 3, wherein the gear has a second gear drive surface that is operatively connected with an auxiliary ratchet drive surface on the auxiliary ratchet and wherein rotation of the gear to a reset position drives the auxiliary ratchet to the primary pawl enabling position and causes the secondary pawl to move to the auxiliary ratchet holding position.

5. A vehicle latch as claimed in claim 4, further comprising a gear biasing member that biases the gear towards the secondary pawl locking position from the secondary pawl release position and from the reset position.

6. A vehicle latch as claimed in claim 5, wherein the secondary pawl locking position is between the secondary pawl release position and the reset position.

7. A vehicle latch as claimed in claim 6, further comprising a reset position sensor positioned to detect the presence of the gear in the reset position.

8. A vehicle latch as claimed in claim 7, further comprising a secondary pawl locking position sensor positioned to detect the presence of the gear in the secondary pawl locking position.

9. A vehicle latch as claimed in claim 8, further comprising a controller that receives signals from the reset position sensor that are indicative of whether the gear reaches the reset position, and wherein the controller is operatively connected to the gear, wherein the controller is configured to:
  a) selectively drive the gear towards the reset position; and
  b) notify a driver of the vehicle of a problem in the event that the gear does not reach the reset position after a selected period of time passes after step a) is initiated.

10. A vehicle latch as claimed in claim 9, further comprising a motor, wherein the controller is operatively connected to the motor and the motor is operatively connected to the gear, wherein the controller is configured to selectively drive the gear towards the reset position via the motor.

11. A vehicle latch as claimed in claim 8, further comprising a controller that receives signals from the secondary pawl locking position sensor that are indicative of whether the gear reaches the secondary pawl locking position, and wherein the controller is operatively connected to the gear, wherein the controller is configured to:
  a) selectively cause movement of the gear towards the secondary pawl locking position; and
  b) carry out at least one action in the event that the gear does not reach the secondary pawl locking position after a selected period of time passes after step a) is initiated, wherein the at least one action is selected from the group of actions consisting of: notifying a driver of the vehicle of a problem with the vehicle latch; and drive the gear towards the secondary pawl locking position.

12. A vehicle latch as claimed in claim 11, further comprising a motor, wherein the controller is operatively connected to the motor and the motor that is operatively connected to the gear, wherein the controller is configured to selectively cause movement of the gear towards the secondary pawl locking position by cutting power to the motor, and to drive the gear towards the secondary pawl by sending power to the motor.

13. A vehicle latch as claimed in claim 7, wherein the reset position sensor comprises a Hall effect sensor and wherein a magnet is positioned on the gear.

14. A vehicle latch, comprising:
  a ratchet movable between a striker capture position wherein the ratchet is positioned to retain a striker and a striker release position wherein the ratchet is positioned to release the striker, wherein the ratchet is biased towards the striker release position;
  a primary pawl movable between a ratchet holding position wherein the primary pawl is positioned to hold the ratchet in the striker capture position and a ratchet release position wherein the primary pawl permits the movement of the ratchet out of the striker capture position, wherein the primary pawl is biased towards the ratchet holding position;
  an auxiliary ratchet wherein, the primary pawl is pivotally mounted to the auxiliary ratchet, wherein the auxiliary ratchet is movable between a primary pawl enabling position in which the primary pawl is biased to the ratchet holding position and a primary pawl disabling position in which the primary pawl moves with the auxiliary ratchet in the ratchet release position, wherein the auxiliary ratchet is biased towards the primary pawl disabling position;
  a secondary pawl movable between an auxiliary ratchet holding position in which the secondary pawl is positioned to hold the auxiliary ratchet in the primary pawl enabling position, and an auxiliary ratchet release position, in which the secondary pawl is positioned to permit movement of the auxiliary ratchet to the primary pawl disabling position, wherein the secondary pawl is biased towards the auxiliary ratchet holding position;
  a gear that is operatively connected to the secondary pawl, wherein the gear is rotatable to cause movement of the secondary pawl towards the auxiliary ratchet holding position and wherein the gear is rotatable to cause movement of the secondary pawl towards the auxiliary ratchet release position, wherein the gear is rotatable to a secondary pawl locking position to lock the secondary pawl in the auxiliary ratchet holding position, and wherein the gear is rotatable to a reset position during which the gear causes movement of the secondary pawl to the auxiliary ratchet holding position after the auxiliary ratchet has moved to the primary pawl enabling position; and
  a reset position sensor positioned to detect the presence of the gear in the reset position.

15. A vehicle latch as claimed in claim 14, wherein movement of the gear to the reset position causes movement of the auxiliary ratchet to the primary pawl enabling position.

16. A vehicle latch as claimed in claim 14, wherein rotation of the gear to the reset position in which the gear causes movement of the secondary pawl to the auxiliary ratchet holding position after causing movement of the auxiliary ratchet to the primary pawl enabling position.

17. A vehicle latch as claimed in claim 14, further comprising a controller that receives signals from the reset position sensor that are indicative of whether the gear reaches the reset position, and wherein the controller is operatively connected to the gear, wherein the controller is configured to:
 a) selectively drive the gear towards the reset position; and
 b) notify a driver of the vehicle of a problem in the event that the gear does not reach the reset position after a selected period of time passes after step a) is initiated.

18. A vehicle latch as claimed in claim 17, further comprising a motor, wherein the controller is operatively connected to the motor and the motor is operatively connected to the gear, wherein the controller is configured to selectively drive the gear towards the reset position via the motor.

19. A vehicle latch as claimed in claim 14, further comprising a secondary pawl locking position sensor positioned to detect the presence of the gear in the secondary pawl locking position.

20. A vehicle latch as claimed in claim 19, further comprising a controller that receives signals from the secondary pawl locking position sensor that are indicative of whether the gear reaches the secondary pawl locking position, and wherein the controller is operatively connected to the gear, wherein the controller is configured to:
 a) selectively cause movement of the gear towards the secondary pawl locking position; and
 b) carry out at least one action in the event that the gear does not reach the secondary pawl locking position after a selected period of time passes after step a) is initiated, wherein the at least one action is selected from the group of actions consisting of: notifying a driver of the vehicle of a problem with the vehicle latch; and driving the gear towards the secondary pawl locking position.

21. A vehicle latch as claimed in claim 20, further comprising a motor, wherein the controller is operatively connected to the motor and the motor that is operatively connected to the gear, wherein the controller is configured to selectively cause movement of the gear towards the secondary pawl locking position by cutting power to the motor, and to drive the gear towards the secondary pawl by sending power to the motor.

22. A vehicle latch as claimed in claim 14, wherein the reset position sensor comprises a Hall effect sensor and wherein a magnet is positioned on the gear.

23. A vehicle latch, comprising:
 a housing;
 a primary ratchet pivotally mounted to the housing via a primary ratchet pin joint and movable between a striker capture position wherein the ratchet is positioned to retain a striker and a striker release position wherein the ratchet is positioned to release the striker, wherein the ratchet is biased towards the striker release position;
 an auxiliary ratchet pivotally mounted to the housing via an auxiliary ratchet pin joint;
 a primary pawl pivotally mounted to the auxiliary ratchet via a primary pawl pin joint and movable between a ratchet holding position wherein the primary pawl is positioned to hold the ratchet in the striker capture position and a ratchet release position wherein the primary pawl permits the movement of the ratchet out of the striker capture position, wherein the primary pawl is biased towards the ratchet holding position,
 wherein the auxiliary ratchet is movable between a primary pawl enabling position in which the auxiliary ratchet permits the primary pawl to move to the ratchet holding position and a primary pawl disabling position in which the auxiliary ratchet positions the primary pawl in the ratchet release position, wherein the auxiliary ratchet is biased towards the primary pawl disabling position;
 a secondary pawl pivotally mounted to the housing via a secondary pawl pin joint and movable between an auxiliary ratchet holding position in which the secondary pawl is positioned to hold the auxiliary ratchet in the primary pawl enabling position, and an auxiliary ratchet release position in which the secondary pawl is positioned to permit movement of the auxiliary ratchet to the primary pawl disabling position, wherein the secondary pawl is biased towards the auxiliary ratchet holding position;
 a gear pivotally mounted to the housing via a gear pin joint for movement about a gear axis, wherein the gear is movable to a secondary pawl locking position in which a gear locking surface on the gear directly blocks movement of a secondary pawl locking surface on the secondary pawl so that the gear directly locks the secondary pawl in the auxiliary ratchet holding position;
 wherein the gear has a first gear drive surface that is engageable directly with a secondary pawl drive surface on the secondary pawl and wherein rotation of the gear to a secondary pawl release position directly drives the secondary pawl to the auxiliary ratchet release position, and
 wherein the gear has a second gear drive surface that is operatively connected with an auxiliary ratchet drive surface on the auxiliary ratchet and wherein rotation of the gear to a reset position drives the auxiliary ratchet to the primary pawl enabling position and causes the secondary pawl to move to the auxiliary ratchet holding position.

24. A vehicle latch as claimed in claim 23, wherein the latch further comprises a reset position sensor positioned to detect the presence of the gear in the reset position;
 a secondary pawl locking position sensor positioned to detect the presence of the gear in the secondary pawl locking position;
 a motor that is operatively connected to the gear; and
 a controller that is operatively connected to the motor, wherein the controller receives signals from the reset position sensor that are indicative of whether the gear reaches the reset position, and signals from the secondary pawl locking position sensor that are indicative of whether the gear reaches the secondary pawl locking position, wherein the controller is configured to:
 a) selectively operate the motor to drive the gear towards the reset position; and
 b) notify a driver of the vehicle of a problem in the event that the gear does not reach the reset position after a selected period of time passes after step a) is initiated, and wherein the controller is configured to:
  c) selectively cut power to the motor to cause movement of the gear towards the secondary pawl locking position; and
  d) carry out at least one action in the event that the gear does not reach the secondary pawl locking position after a selected period of time passes after step a) is initiated, wherein the at least one action is selected from the group of actions consisting of: notifying a driver of the vehicle of a problem with the vehicle latch; and drive the gear via the motor towards the secondary pawl locking position.

25. A vehicle latch, comprising:
a ratchet movable between a striker capture position wherein the ratchet is positioned to retain a striker and a striker release position wherein the ratchet is positioned to release the striker, wherein the ratchet is biased towards the striker release position;
a primary pawl movable between a ratchet holding position wherein the primary pawl is positioned to hold the ratchet in the striker capture position and a ratchet release position wherein the primary pawl permits the movement of the ratchet out of the striker capture position, wherein the primary pawl is biased towards the ratchet holding position;
an auxiliary ratchet, wherein the primary pawl is pivotally mounted to the auxiliary ratchet, wherein the auxiliary ratchet is movable between a primary pawl enabling position in which the primary pawl moves with the auxiliary ratchet to the ratchet holding position and a primary pawl disabling position in which the primary pawl moves with the auxiliary ratchet in the ratchet release position, wherein the auxiliary ratchet is biased towards the primary pawl disabling position;
a secondary pawl movable between an auxiliary ratchet holding position in which the secondary pawl is positioned to hold the auxiliary ratchet in the primary pawl enabling position, and an auxiliary ratchet release position in which the secondary pawl is positioned to permit movement of the auxiliary ratchet to the primary pawl disabling position, wherein the secondary pawl is biased towards the auxiliary ratchet holding position; and
a gear that is operatively connected to a motor for movement in response to selective actuation of the motor to a secondary pawl locking position in which a gear locking surface on the gear directly blocks movement of a secondary pawl locking surface on the secondary pawl so that the gear directly locks the secondary pawl in the auxiliary ratchet holding position.

* * * * *